US012168592B2

(12) United States Patent
Sudi et al.

(10) Patent No.: US 12,168,592 B2
(45) Date of Patent: Dec. 17, 2024

(54) DETERMINING ELEVATOR CAR LOCATION USING RADIO FREQUENCY IDENTIFICATION

(71) Applicant: Otis Elevator Company, Farmington, CT (US)

(72) Inventors: Sandeep Sudi, Farmington, CT (US); Vinay Shimoga Baburao, Karnataka (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1521 days.

(21) Appl. No.: 16/543,675

(22) Filed: Aug. 19, 2019

(65) Prior Publication Data

US 2020/0071126 A1 Mar. 5, 2020

(30) Foreign Application Priority Data

Aug. 30, 2018 (IN) ............................ 201811032615

(51) Int. Cl.
*B66B 5/00* (2006.01)
*B66B 1/34* (2006.01)

(52) U.S. Cl.
CPC .......... *B66B 5/0025* (2013.01); *B66B 1/3453* (2013.01)

(58) Field of Classification Search
CPC ... B66B 5/0025; B66B 1/3453; B66B 1/3492; B66B 5/0018; B66B 1/3423; B66B 5/02
See application file for complete search history.

(56) References Cited

U.S. PATENT DOCUMENTS

| | | | |
|---|---|---|---|
| 7,264,090 | B2 | 9/2007 | Vecchiotti et al. |
| 7,537,092 | B2 | 5/2009 | Birrer et al. |
| 7,600,613 | B2 | 10/2009 | Kang et al. |
| 7,669,698 | B2 | 3/2010 | Jahkonen |
| 8,123,003 | B2 | 2/2012 | Meri et al. |
| 8,276,716 | B2 | 10/2012 | Meri et al. |
| 8,408,364 | B2 | 4/2013 | Kangas |
| 9,567,188 | B2 * | 2/2017 | Huff ...................... B66B 5/0025 |
| 9,695,015 | B1 | 7/2017 | Marinelli |
| 9,771,241 | B2 | 9/2017 | Varelius et al. |

(Continued)

FOREIGN PATENT DOCUMENTS

| | | | |
|---|---|---|---|
| CN | 104787635 | A | 7/2015 |
| CN | 104876082 | A | 9/2015 |

(Continued)

OTHER PUBLICATIONS

CN Office Action; Issued: Dec. 17, 2020; CN Application No. 201910808719.0; Filed: Aug. 29, 2019; 5 pages.

(Continued)

*Primary Examiner* — Jeffrey Donels
(74) *Attorney, Agent, or Firm* — CANTOR COLBURN LLP

(57) ABSTRACT

Methods and systems for determining elevator car locations are provided. Aspects includes operating, by a processor, a sensor to obtain tag data from a tag within a range of the sensor, wherein the tag is affixed to at least one landing of a plurality of landings in a hoistway of a building, wherein the sensor is affixed to a moving component of an elevator car operating in the hoistway of the building and analyzing the tag data to determine a position of the elevator car in the hoistway of the building.

17 Claims, 4 Drawing Sheets

(56) References Cited

U.S. PATENT DOCUMENTS

| | | | | |
|---|---|---|---|---|
| 9,809,419 | B2 | 11/2017 | Otsuka et al. | |
| 2005/0039987 | A1 | 2/2005 | Redden | |
| 2012/0031710 | A1 | 2/2012 | Meri et al. | |
| 2015/0336768 | A1 | 11/2015 | Otsuka et al. | |
| 2020/0087111 | A1 * | 3/2020 | Wos | B66B 1/3461 |

FOREIGN PATENT DOCUMENTS

| | | | |
|---|---|---|---|
| CN | 204737523 | U | 11/2015 |
| CN | 205575305 | U | 9/2016 |
| CN | 110872039 | | 3/2020 |
| EP | 3150535 | A1 * | 4/2017 |
| JP | 4776992 | B2 | 9/2011 |
| JP | 2012224422 | A | 11/2012 |
| JP | 5790462 | A | 6/2013 |
| JP | 2018080039 | A | 5/2018 |
| KR | 101209597 | A | 4/2012 |
| WO | 14136200 | A1 | 9/2014 |
| WO | 2015059821 | A1 | 4/2015 |

OTHER PUBLICATIONS

EP Search Report; Issued: Mar. 20, 2020; EP Application No. 19194740.7; Filed: Aug. 30, 2019; 6 pages.

CN Office Action; Issued: Jan. 6, 2022; CN Application No. 201910808719.0; Filed: Aug. 29, 2019; 3 pages.

CN Office Action; Issued: Jun. 29, 2021; CN Application No. 201910808719.0; Filed: Aug. 29, 2019; 4 pages.

EP Office Action; Issued: Aug. 4, 2021; Application No. 19194740.7; Filed: Aug. 30, 2019; 4 pages.

* cited by examiner

DETERMINING ELEVATOR CAR LOCATION USING RADIO FREQUENCY IDENTIFICATION

CROSS-REFERENCE TO RELATED APPLICATIONS

This application claims the benefit of Indian Provisional Application No. 201811032615 filed Aug. 30, 2018, which is incorporated herein by reference in its entirety.

BACKGROUND

The subject matter disclosed herein generally relates to elevator systems and, more particularly, to a system for determining elevator car location in an elevator system using RFID sensors.

Elevator systems typically operate with a variety of sensors that are utilized to determine the position of an elevator car within a hoistway. At the same time, sensor data can be collected to predict maintenance needs and any changes to operating conditions. Sensor data collected from a variety of sensors is most useful when tied to a location of the elevator car within a hoistway which allows a maintenance system to extract per landing metrics for service efficiency gains.

BRIEF DESCRIPTION

According to one embodiment, a system is provided. The system includes a controller coupled to a memory, a sensor affixed to a moving component of an elevator car operating in a hoistway of a building, wherein the sensor is operated by the controller and a tag affixed to at least one landing of a plurality of landings in the hoistway of the building, wherein the controller is configured to operate the sensor to obtain tag data from the tag within a range of the sensor and analyze the tag data to determine a position of the elevator car in the hoistway of the building.

In addition to one or more of the features described above, or as an alternative, further embodiments of the system may include that the controller is further configured to, based at least on a determination of the position of the elevator car in the hoistway, operate an elevator sensor to collect sensor data associated with the elevator car and associate the sensor data with the position of the elevator car.

In addition to one or more of the features described above, or as an alternative, further embodiments of the system may include that the controller is further configured to transmit the sensor data to a condition based maintenance system.

In addition to one or more of the features described above, or as an alternative, further embodiments of the system may include that the tag data is associated with a floor in the building.

In addition to one or more of the features described above, or as an alternative, further embodiments of the system may include that the sensor is further configured to obtain the tag data from the tag within a range of the sensor while the elevator car is moving.

In addition to one or more of the features described above, or as an alternative, further embodiments of the system may include that the sensor is further configured to receive the tag data from the tag within a range of the sensor while the elevator car is stationary.

In addition to one or more of the features described above, or as an alternative, further embodiments of the system may include the tag is a first tag, wherein the tag data is a first tag data and a second tag affixed to each landing of the plurality of landings in the hoistway of the building and wherein the controller is further configured to operate the sensor to obtain second tag data from the second tag within the range of the sensor and analyze the first tag data and the second tag data to determine a quality condition for the elevator car.

In addition to one or more of the features described above, or as an alternative, further embodiments of the system may include that the quality condition is an alignment level of an entryway of the elevator car and a landing entryway in the building.

In addition to one or more of the features described above, or as an alternative, further embodiments of the system may include that the controller is further configured to perform an initialization operation for the tag affixed to each landing of the plurality of landings in the hoistway of the building, the initialization operation comprising operating the elevator car to travel to each landing in the plurality of landing, receiving the tag data for the tag at each landing, assigning a tag code for the tag at each landing, and storing the tag code in memory.

In addition to one or more of the features described above, or as an alternative, further embodiments of the system may include that the sensor is an RF reader and the tag is an RFID tag.

According to one embodiment, a method is provided. The method includes operating, by a processor, a sensor to obtain tag data from a tag within a range of the sensor, wherein the tag is affixed to at least one landing of a plurality of landings in a hoistway of a building, wherein the sensor is affixed to a moving component of an elevator car operating in the hoistway of the building and analyzing the tag data to determine a position of the elevator car in the hoistway of the building.

In addition to one or more of the features described above, or as an alternative, further embodiments of the method may include transmitting the sensor data to a condition based maintenance system.

In addition to one or more of the features described above, or as an alternative, further embodiments of the method may include that the tag data is associated with a floor in the building.

In addition to one or more of the features described above, or as an alternative, further embodiments of the method may include that the sensor is further configured to receive the tag data from the tag within a range of the sensor while the elevator car is moving.

In addition to one or more of the features described above, or as an alternative, further embodiments of the method may include that the tag is a first tag, the tag data is a first tag data, wherein a second tag is affixed to each landing of the plurality of landings in the hoistway of the building and operating the RF reader to receive second tag data from the second tag within the range of the RF reader and analyzing the first tag data and the second tag data to determine a quality condition for the elevator car, wherein the quality condition is a difference in an alignment level of an entryway of the elevator car and a landing entryway in the building.

In addition to one or more of the features described above, or as an alternative, further embodiments of the method may include that performing an initialization operation for the tag affixed to each landing of the plurality of landings in the hoistway of the building, the initialization operation comprising operating the elevator car to travel to each landing in the plurality of landing, receiving the tag data for the tag at each landing, assigning a tag code for the tag at each landing, and storing the tag code in memory.

In addition to one or more of the features described above, or as an alternative, further embodiments of the method may include that determining the position of the elevator car in the hoistway of the building comprises comparing the tag code of a landing to the tag code stored in memory to identify a landing associated with the tag code.

According to one embodiment, an elevator system is provided. The elevator system includes an elevator car, an elevator car location system comprising a controller coupled to a memory, a sensor affixed to a moving component of an elevator car operating in a hoistway of a building, wherein the sensor is operated by the controller, and a tag affixed to at least one landing of a plurality of landings in the hoistway of the building, wherein the controller is configured to operate the sensor to obtain tag data from the tag within a range of the sensor and analyze the tag data to determine a position of the elevator car in the hoistway of the building.

In addition to one or more of the features described above, or as an alternative, further embodiments of the elevator system may include that the controller is further configured to, based at least on a determination of the position of the elevator car in the hoistway, operate an elevator sensor to collect sensor data associated with the elevator car and associate the sensor data with the position of the elevator car.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
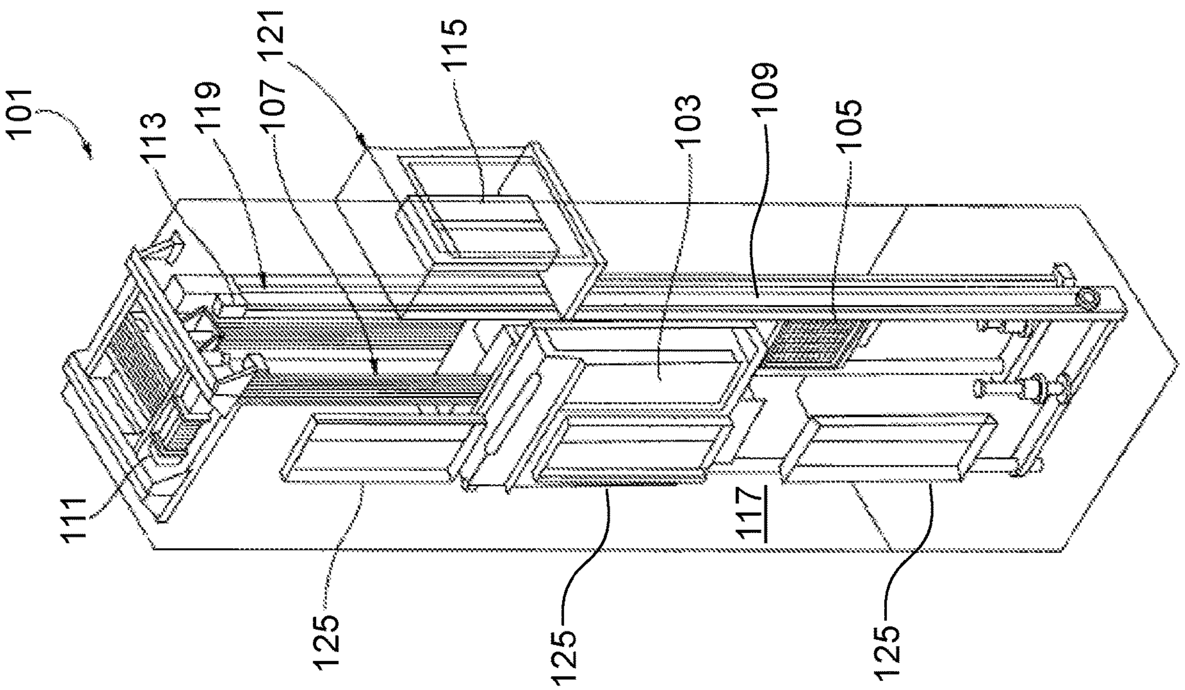
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
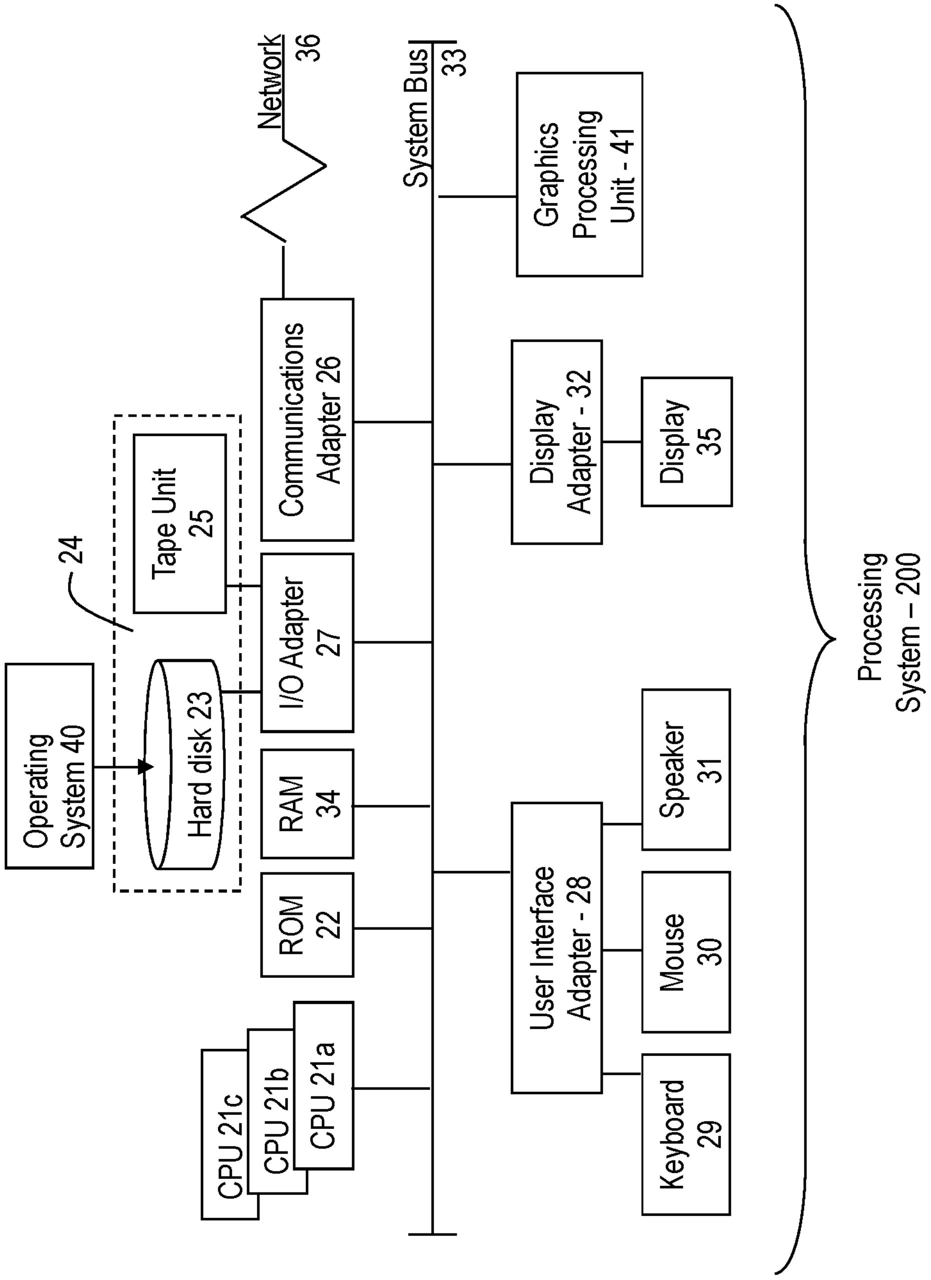
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21*a*, 21*b*, 21*c*, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, collection of elevator performance data can be useful for predicting maintenance needs for the elevator system. However, in order to help make elevator performance data as useful as possible for predicting these maintenance needs, the data should typically be coupled with specific locations of the elevator within the elevator hoistway. For example, when a particular landing door requires maintenance, the floor location tied to performance data is helpful for identifying the particular landing door. Likewise, maintenance might want to know if poor door performance is linked to all landing doors, or specific landing doors. Typically, an elevator system can know at which floor an elevator is located by using a monitoring device capable of communicating with the elevator controller, or by utilizing sensors in the hoistway to determine which floor the elevator car is passing or landing on. However, installing these sensors in communication with an elevator controller can be expensive especially for existing elevator systems. There exists a need for an easy to install, low cost system that can determine the location of an elevator car within the elevator hoistway.

Turning now to an overview of the aspects of the disclosure, one or more embodiments address the above-described shortcomings of the prior art by providing an elevator car location sensing system utilizing a radio frequency identification (RFID) that can determine an elevator car location within a hoistway based on the interaction between RF readers and associated RFID tags located within the elevator hoistway. In one or more embodiments, an elevator mechanic can assign and mount a unique RFID tag at each landing corresponding to a floor number in a building or site. An RF sensor or reader can be mounted on an elevator car that is configured to transmit an RF signal and receive a corresponding RFID response from an RFID tag within range of the RF sensor. The elevator mechanic can initialize the RFID system by performing a training run and initiate an elevator run from the bottom floor of a hoistway and the top floor of the hoistway. The RFID tags can be read using similar means as described above and programmed into a memory to record what RFID tags are at each floor in this training run. In one or more embodiments, the sensing of a specific RFID tag by the RFID sensor can trigger other sensors (vibration sensors, etc.) to collect sensor data which can saved and/or transmitted to a condition based management (CBM) system or any other system that handles inspection or maintenance for an elevator system. Some example sensor data that can be collected by the other sensors includes floor level accuracy sensing and other similar information related to each landing. In one or more embodiments, the RF sensing system can be utilized during installation of new elevator systems or can be utilized to retro-fit existing elevator systems due to the independence of the RF system.

Figure 3:
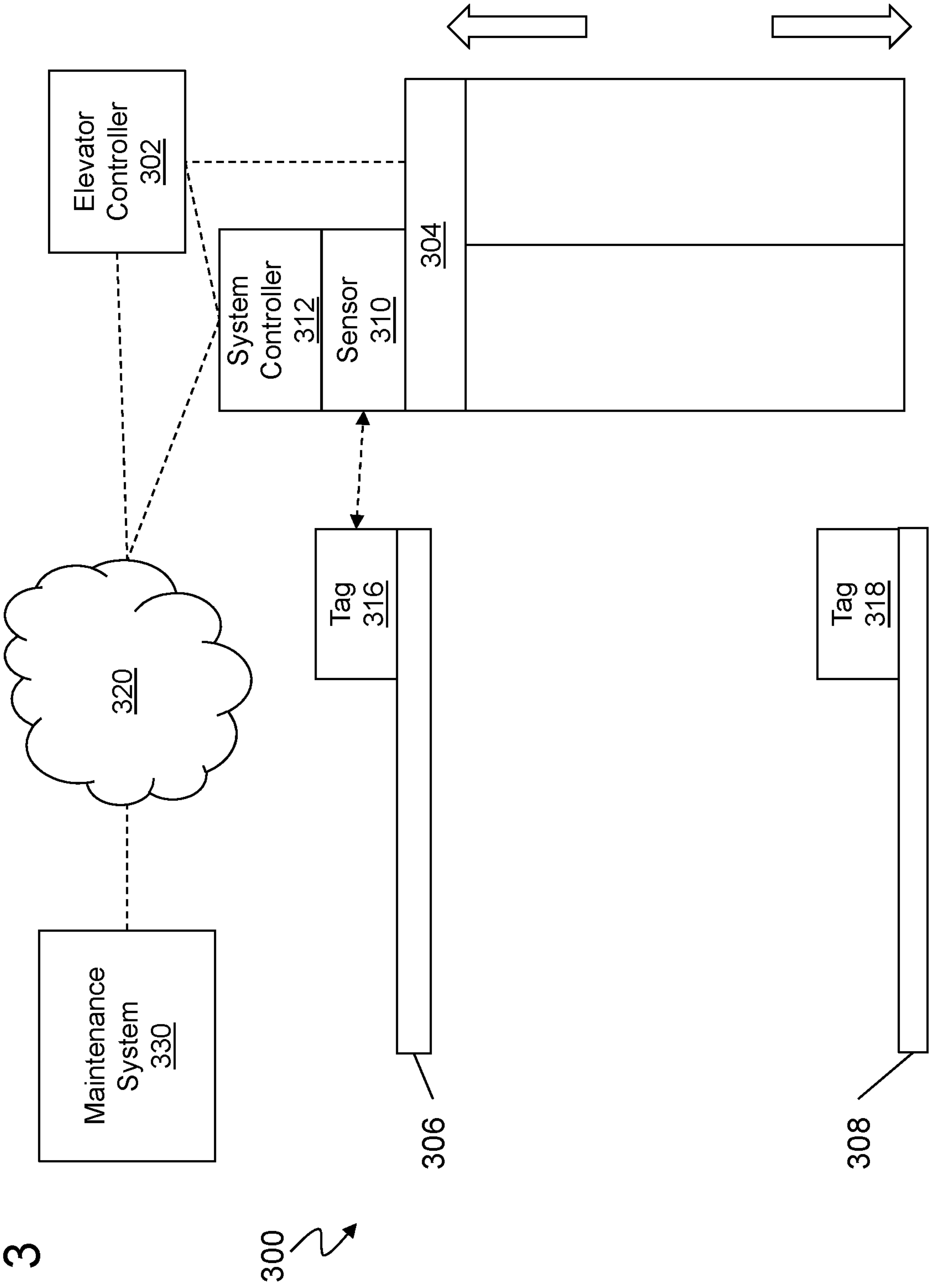
FIG. 3 depicts a block diagram of an elevator system 300 with a sensor system for determining elevator car locations according to one or more embodiments of the disclosure.

Turning now to a more detailed description of aspects of the present disclosure, FIG. 3 depicts an elevator system 300 with a sensor system for determining elevator car location. The system 300 includes an elevator controller 302, an elevator car 304, a sensor 310, a system controller 312, a network 320, and a maintenance system 330. The elevator system 300 can be operated at a building that includes a number of floors serviced by the elevator system 300. Each floor has an associated floor landing 306, 308 and a tag 316, 318 at each landing. The tags 316, 318 can be located within an elevator hoistway at each landing 306, 308. While the illustrated example shows only two landings and two tags, multiple landings and tags can be utilized for the system 300.

In one or more embodiments, the sensor 310 can be a radio frequency (RF) sensor and operable by the system controller 312. The tags 316, 318 can be RFID tags, a passive communication interface, that have tag data stored within each tag 316, 318. The tag data can be obtained by the RF sensor by transmitting an RF signal and receiving the corresponding tag data from the RFID tag using known RF technology means.

In one or more embodiments, the sensor 310 can be a near field communication (NFC) sensor and operable by the system controller 312. The tags 316, 318 can be devices readable by the NFC sensor with tag data stored within. The tag data can be obtained from the tags through known NFC technology means. In one or more embodiments, the sensor 310 can be an optical sensor and operable by the system controller 312. The optical sensor can be configured to scan or read the tags 316, 318. For example, the tags can be alpha-numeric characters that the optical reader scans allowing for the system controller 312 to analyze the alpha-numeric characters to determine a location of the elevator car 304. In another example, the tags can be barcodes or 2D barcodes that are readable by the optical sensor. The tag data can be obtained from the optical sensor and decoded by the system controller 312. In one or more embodiments, the sensor 310 can be a Bluetooth® sensor and operable by the system controller 312. The tags 316, 318 can be beacons that can be read by the Bluetooth® sensor. In one or more embodiments, the system controller 312 can also be a sensor hub. The sensor hub can signal the sensor 310 to read the landing information or tag 316, 318. Multiple sensor inputs from the elevator (vibration sensor) can trigger the sensor 310 to read the tags 316, 318. For example, a specific vibration pattern can trigger the sensor 310 to operate and read a tag 316, 318 at certain locations that are close to a floor landing such as right after an elevator car traverses an express portion of the hoistway.

In one or more embodiments, the elevator controller 302, system controller 312, and sensor 310 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable cloud computing node and is not intended to suggest any limitation as to the scope of use or functionality of embodiments described herein.

In one or more embodiments, the sensor 310 can be affixed to a moving component of the elevator car 304 such as, for example, the top portion of the elevator car 304 or the bottom or side portions of the elevator car 304. For example, the sensor 310 can be affixed to a sheave or counterweight in an elevator system. In yet another embodiment, the sensor 310 can be affixed to the door header of the elevator car and positioned such that the sensor 310 can collect tag data associated with the tags 316, 318 at each floor landing in a building hoistway. The system controller 312 can analyze this tag data to determine the location of the elevator car 304 in a hoistway. The sensor 310 and tags 316, 316 can be located anywhere in the hoistway to be representative of the elevator car 304 location including mounting on the elevator rails, for example.

In one embodiment, the system controller 312 can initialize the system 300 by operating the elevator car 304 to travel to each floor in a building. At each floor will be a tag with a unique identifier. At each floor, the sensor 310 can receive this unique identifier and associated with the particular floor and save it in a memory of the system controller 312, the cloud 320, or the maintenance system 330. In one or more embodiments, as the elevator car 304 is in operation the sensor 310 reads the tags 316, 318 and compares the unique identifier received from the tag with the unique identifiers stored in the memory to determine the floor location and thus the location of the elevator car 304 within the hoistway of the building. In one or more embodiments, the tags 316, 318 can be placed anywhere within the hoistway of the building. The tags 316, 318 can be placed at every other floor or at only certain floors. For example, floors within an express zone of a building may not have tags 316, 318 placed because the elevator car 304 does not stop at these floor.

In one or more embodiments, the system controller 312 determines the elevator car 304 location and can trigger the collection of other sensor data by additional sensors. The system controller 312 can transmit the data to the cloud 320 or maintenance system 330 with the associated elevator car 304 location. The other sensor data can include information such as vibration data which can be transmitted to the maintenance system 330. In one or more embodiments, if the vibration data exceeds a threshold amount of vibrations a maintenance call can be initiated by the maintenance system. The threshold can be a vibration magnitude that is compared to the measured vibration of the elevator car 304 by the additional sensors. In one or more embodiments, the additional sensors can collect any type of data associated with the operation of the elevator car 304 such as, for example, noise data, sag and bounce data, velocity data, moisture data, and any type of environmental data, etc. This data can be utilized for maintenance and/or quality control, for example.

In one or more embodiments, the system 300 can include more than one tag at each landing, for example at the top of a floor opening and at the bottom of a floor opening. The tag at each floor location can be read by the sensor 310 to determine quality factors such as, for example, sag and bounce as well as floor alignment. Floor alignment refers to how the difference in level of the elevator car 304 floor with the elevator opening at the floor of the building. This floor alignment can provide information for the system controller 312 to determine if there is an issue with tripping hazards for the elevator car. A threshold alignment can be determined based on the hazard level. For example, a threshold of 3 centimeters could be set to indicate a maintenance issue. Any misalignment beyond the 3 centimeters could be sent along to the maintenance system 330 to trigger a maintenance operation. In one or more embodiments, multiple thresholds can be set to indicate the severity of the tripping hazard. For example, a threshold of 6 centimeters could be set, by a mechanic or building manager, to trigger the shutting down of operation of the elevator car 304.

In one or more embodiments, the system 300 can display the location of the elevator car 304 to a dashboard on a display device based on the RFID tags being analyzed by the system controller 312. The system 300 can determine an estimate of the location of the elevator car 304 in the elevator hoistway based on how recent the sensor 312 read the RFID tag, the tag data, and the speed of travel of the elevator car 304. The tag data supplies a unique number that includes the floor identification. This tag data can be stored in a memory of the system controller 312 from an initialization operation performed by the elevator mechanic or a building manager. From this tag data, the system 300 can know the location of the elevator car 304 as it passes the specific tag and based on the speed estimate the location between floors of the elevator car 304 to display on the dashboard. As the elevator car 304 reaches the next tag, the tag data from the next tag will confirm the location of the elevator car 304.

Figure 4:
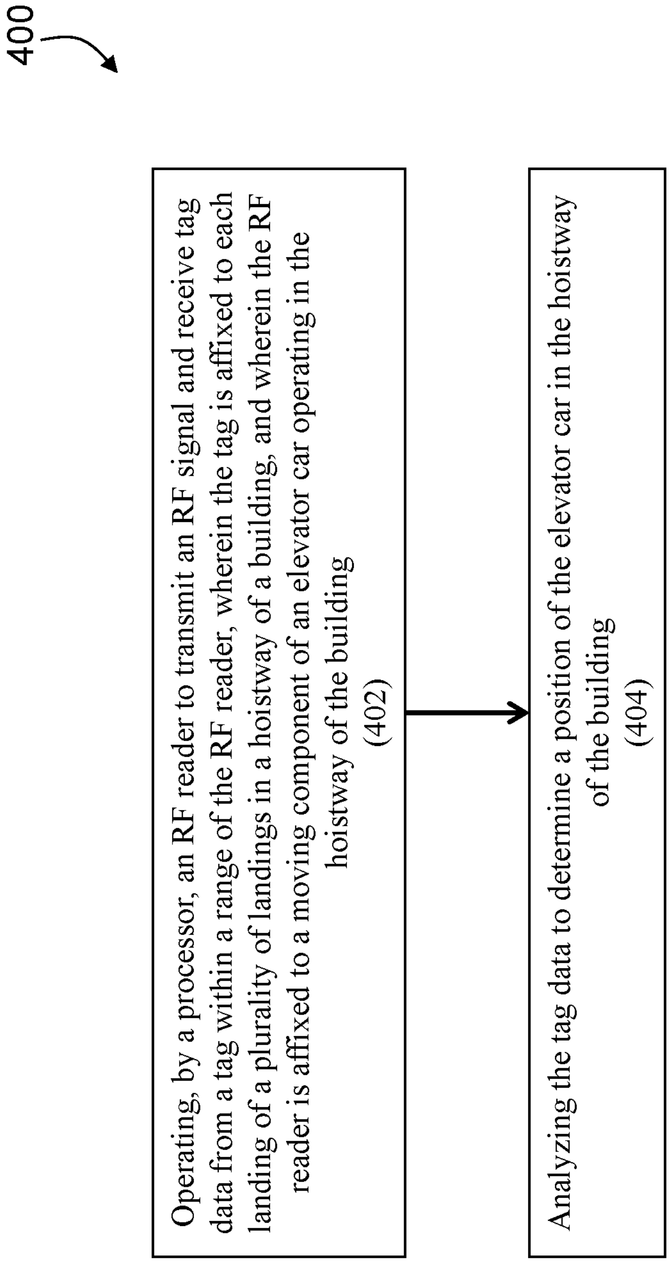
FIG. 4 depicts a flow diagram of a method for determining elevator car locations according to one or more embodiments of the disclosure.

FIG. 4 depicts a flow diagram of a method for determining elevator car locations according to one or more embodiments. The method 400 includes operating, by a processor, an RF reader to transmit an RF signal and receive tag data from a tag within a range of the RF reader, wherein the tag is affixed to each landing of a plurality of landings in a hoistway of a building, and wherein the RF reader is affixed to a moving component of an elevator car operating in the hoistway of the building, as shown in block 402. And at block 404, the method 400 includes analyzing the tag data to determine a position of the elevator car in the hoistway of the building.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for determining elevator car locations, the system comprising:
- a controller coupled to a memory;
- a sensor affixed to a moving component of an elevator car operating in a hoistway of a building, wherein the sensor is operated by the controller; and
- a tag affixed to at least one landing of a plurality of landings in the hoistway of the building;
- wherein the controller is configured to:
  - operate the sensor to obtain tag data from the tag within a range of the sensor;
  - analyze the tag data to determine a position of the elevator car in the hoistway of the building;
  - based at least on a determination of the position of the elevator car in the hoistway, operate an elevator sensor to collect sensor data associated with the elevator car; and
  - associate the sensor data with the position of the elevator car.

2. The system of claim 1, wherein the controller is further configured to transmit the sensor data to a condition based maintenance system.

3. The system of claim 1, wherein the tag data is associated with a floor in the building.

4. The system of claim 1, wherein the sensor is further configured to obtain the tag data from the tag within a range of the sensor while the elevator car is moving.

5. The system of claim 1, wherein the sensor is further configured to receive the tag data from the tag within a range of the sensor while the elevator car is stationary.

6. The system of claim 1, wherein the tag is a first tag;
- wherein the tag data is a first tag data; and
- further comprising: a second tag affixed to each landing of the plurality of landings in the hoistway of the building; and
  - wherein the controller is further configured to:
  - operate the sensor to obtain second tag data from the second tag within the range of the sensor;
  - analyze the first tag data and the second tag data to determine a quality condition for the elevator car.

7. The system of claim 6, wherein the quality condition is an alignment level of an entryway of the elevator car and a landing entryway in the building.

8. The system of claim 1, wherein the controller is further configured to:
- perform an initialization operation for the tag affixed to each landing of the plurality of landings in the hoistway of the building, the initialization operation comprising:
  - operating the elevator car to travel to each landing in the plurality of landing;
  - receiving the tag data for the tag at each landing;
  - assigning a tag code for the tag at each landing; and
  - storing the tag code in memory.

9. The system of claim 1, wherein the sensor is an RF reader; and
- wherein the tag is an RFID tag.

10. A method for determining elevator car locations, the method comprising:
- operating, by a processor, a sensor to obtain tag data from a tag within a range of the sensor, wherein the tag is affixed to at least one landing of a plurality of landings in a hoistway of a building, and
- wherein the sensor is affixed to a moving component of an elevator car operating in the hoistway of the building; and
- analyzing the tag data to determine a position of the elevator car in the hoistway of the building;
- based at least on a determination of the position of the elevator car in the hoistway, operating an elevator sensor to collect sensor data associated with the elevator car; and
- associating the sensor data with the position of the elevator car.

11. The method of claim 10, further comprising transmitting the sensor data to a condition based maintenance system.

12. The method of claim 10, wherein the tag data is associated with a floor in the building.

13. The method of claim 10, wherein the sensor is further configured to receive the tag data from the tag within a range of the sensor while the elevator car is moving.

14. The method of claim 10, wherein the tag is a first tag;
- wherein the tag data is a first tag data;
- wherein a second tag is affixed to each landing of the plurality of landings in the hoistway of the building; and
- operating the sensor to receive second tag data from the second tag within the range of the sensor;
- analyzing the first tag data and the second tag data to determine a quality condition for the elevator car, wherein the quality condition is a difference in an alignment level of an entryway of the elevator car and a landing entryway in the building.

15. The method of claim 10 further comprising:
- performing an initialization operation for the tag affixed to each landing of the plurality of landings in the hoistway of the building, the initialization operation comprising:
  - operating the elevator car to travel to each landing in the plurality of landing;

receiving the tag data for the tag at each landing;
assigning a tag code for the tag at each landing; and
storing the tag code in memory.

16. The method of claim 15, wherein determining the position of the elevator car in the hoistway of the building comprises comparing the tag code of a landing to the tag code stored in memory to identify a landing associated with the tag code.

17. An elevator system comprising:
an elevator car;
an elevator car location system comprising:
a controller coupled to a memory;
a sensor affixed to a moving component of an elevator car operating in a hoistway of a building, wherein the sensor is operated by the controller; and
a tag affixed to at least one landing of a plurality of landings in the hoistway of the building;
wherein the controller is configured to:
operate the sensor to obtain tag data from the tag within a range of the sensor; and
analyze the tag data to determine a position of the elevator car in the hoistway of the building;
based at least on a determination of the position of the elevator car in the hoistway, operate an elevator sensor to collect sensor data associated with the elevator car; and
associate the sensor data with the position of the elevator car.

* * * * *